United States Patent [19] [11] Patent Number: 6,036,422
Postma et al. [45] Date of Patent: Mar. 14, 2000

[54] ROLLER WASHER BEARING AND METHOD

[75] Inventors: Robert W. Postma, Los Angeles; Robert B. Pan; Brian T. Hamada, both of Torrance; Louis K. Herman, Rancho Palos Verdes, all of Calif.

[73] Assignee: The Aerospace Corporation, El Segundo, Calif.

[21] Appl. No.: 09/119,511

[22] Filed: Jul. 20, 1998

[51] Int. Cl.⁷ ..................................................... F16B 43/00
[52] U.S. Cl. ........................ 411/534; 411/537; 52/167.5; 403/28
[58] Field of Search ............................ 411/531, 534–539, 411/545–547, 428; 403/28, 408.1; 52/167.5, 167.6; 384/56, 36

[56] References Cited

U.S. PATENT DOCUMENTS

| 679,939 | 6/1901 | Eveland | 411/534 |
| 3,604,306 | 9/1971 | Denholm | 411/535 |
| 5,116,158 | 5/1992 | Carruthers | 403/28 |

FOREIGN PATENT DOCUMENTS

| 234612 | 9/1989 | Japan | 411/531 |
| 387156 | 6/1973 | Russian Federation | 411/537 |
| 781424 | 11/1980 | Russian Federation | 411/534 |

*Primary Examiner*—Flemming Saether
*Attorney, Agent, or Firm*—Derrick Michael Reid

[57] ABSTRACT

A linear roller washer bearing in a bolt interface assembly allows relative differential thermal expansion and contraction motion between a component plate and a base plate fastened together by a bolt without inducing large strains and stresses upon the bolt. The roller washer bearing functions as a thin spacer between the component and base plates enabling high preload tightening of the bolted assembly while enabling relative bidirectional motion of the plates. The roller washer bearing is a multiple roller assembly with thin rollers arranged unidirectionally and horizontally in parallel between the top and bottom washer plates. The rollers roll back and forth to enable relative back and forth alternating unidirectional motion of the component and base plates while the full strength of the bolt remains available to the support the component plate without creating high friction shear forces.

8 Claims, 4 Drawing Sheets

ROLLER WASHER BEARING ASSEMBLY WITH ROCKER WASHER

ROLLER WASHER BEARING

ROLLER WASHER BEARING ASSEMBLY

ROLLER WASHER BEARING ASSEMBLY WITH ROCKER WASHER

ANGULAR ROLLER WASHER BEARING

ROLLER WASHER BEARING AND METHOD

REFERENCE TO RELATED APPLICATION

The present application is related to applicant's copending application entitled "Flexure Washer Bearing and Method" Ser. No. 09/119,510, Jul. 20, 1998 by the same inventors.

SPECIFICATION

STATEMENT OF GOVERNMENT INTEREST

The invention was made with Government support under contract F04701-93-C-0094 by the Department of the Air Force. The Government has certain rights in the invention. The invention described herein may be manufactured and used by and for the government of the United States for governmental purpose without payment of royalty therefor.

FIELD OF THE INVENTION

The invention relates to the field of mechanical washers and linear bearings and mechanical assemblies subjected to thermal expansion stresses and differential motion during temperature variations.

BACKGROUND OF THE INVENTION

Changes in temperature can cause excessive thermal stresses at the attachment points between arbitrary parallel plates of a mechanical assembly, such as a top component plate and a bottom base, both rigidly fastened together. An example of such a mechanical assembly is a high precision optical instrument assembly or inertial guidance unit on a spacecraft. The unit has an aluminum housing bolted to a graphite-epoxy honeycomb support base structure. The instrument and/or the support base are subjected to large changes in orbital temperature with resulting differential expansions between the base structure and the instrument. The top component plate and the bottom base plate could be fastened together using conventional fastening bolts, nuts and washers, through aligned holes extending through the component and base plates. The top component plate and the bottom base plate may have substantially different coefficients of thermal expansion. The resulting unequal amounts of expansion or contraction, if constrained, can cause significant locally induced strains and stresses. During temperature variations, the top component plate may expand and contract at a different rate than the bottom base plate, thereby tending to misalign the base holes and placing stresses upon the bolts extending through the fastening holes, leading to stress and even eventual failure of the bolt. The differential in the thermal expansion can also lead to damage to the component plate and base plate, or may result in misalignment of precision mounted instruments. These and other disadvantages are eliminated or reduced using the invention.

SUMMARY OF THE INVENTION

An object of the invention is to provide a linear roller washer bearing which reduces stresses in an assembly having fastening bolts extending between a component plate and a base plate, both expanding and contracting at differing rates during temperature variations.

Another object of the invention is to provide a method of rigidly fastening the component and base plates together using a linear roller washer bearing, thus enabling the component and base plates to expand and contract at differing rates during temperature variations without inducing excessive stresses in the component or base plate.

The present invention is a linear roller washing bearing and method of use. The roller bearing comprises a plurality of parallel rollers extending between a top washer plate and a bottom washer plate. The rollers can roll back and forth between the top and bottom washer plates in the presence of horizontal forces upon the top washer plate relative to the bottom washer plate.

In one aspect of the invention, the two roller washer bearings are disposed in alignment around a bolt hole having a larger diameter than a fastening bolt extending through the bolt hole in the top component plate and into the bottom base plate into which is rigidly fastened the bolt. The bolt fastens together the top component plate, the bottom base plates and the two roller washer bearings. In the preferred form, a bottom roller bearing is disposed between the bottom base plate and the top component plate and another top roller bearing is disposed between the bolt head the top component plate, with the bolt rigidly fastened into the bottom base plate. As the top component plate expands or contracts relative to the bottom base plate during temperature variations, the bottom washer plate of the bottom washer remains rigidly affixed to the bottom component plate and the top washer plate of the top roller washer bearing remains rigidly affixed to the bolt head, and the bottom washer plate of the top roller washer bearing and the top washer plate of the bottom washer bearing remain affixed to the top component plate, with the rollers of both roller washer bearings rolling slightly to enable the expansion and contraction of the top component plate relative to the base plate without placing stresses upon the bolt. As the top component plate expands or contracts, the rollers roll back and forth so that the hole in the top component plate moves in misalignment relative to the hole in the bottom base plate. At all times, the bolt remains in a rigid vertical and orthogonal position relative to the horizontally extending assembly. The hole in the component plate is larger than the bolt stem to create sufficient space for the relative movement without the top component plate inducing stresses in the fastening bolt.

In another aspect of the invention, one roller washer bearing is disposed between the top component plate and the bottom base plate with the top washer plate being rigidly fastened to the top component plate and with the bottom washer plate being rigidly fastened to the bottom base plate, again with an alignment hole larger than the diameter of the bolt stem around which is disposed a pair of rocker washers, one rocker washer disposed between the bolt head and the top component plate and the other rocker washer disposed between the bottom base plate and a bottom fastening nut. As the top component plate expands or contracts, the rollers roll back and forth so that the hole in the top component plate moves in misalignment relative to the hole in the bottom base plate, causing the bolt to cock, that is, rotate within the alignment hole as the rocker washers rock upon the respective component and base plates. At all times, the bolt remains in a rigid position affixed to the bottom base plate. The hole in the component plate being larger than the bolt stem to create sufficient space for the relative rotation of the bolt stem within the alignment hole inducing stresses in the fastening bolt.

In a third aspect of the invention, the rollers within the roller washer bearing are slanted at an angle to enable relative motion along only one direction relative to the plane of the roller washer bearing.

The invention releases interface stresses by allowing relative differential motion between the component plate and base plate fastened by a bolt. The full strength of the bolt is available to support the component plate. The strength of the bolted assembly is not compromised in the presence of relative thermal expansion and contraction. The rollers within the roller washer avoid friction shear forces. The roller washer bearings function as a thin spacer between the component and base plates, thus enabling high preload tightening of the bolted assembly. These and other advantages will become more apparent from the following detailed description of the preferred embodiment.

DETAILED DESCRIPTION OF THE PREFERRED EMBODIMENT

Figures 1A, 1B, 1C:
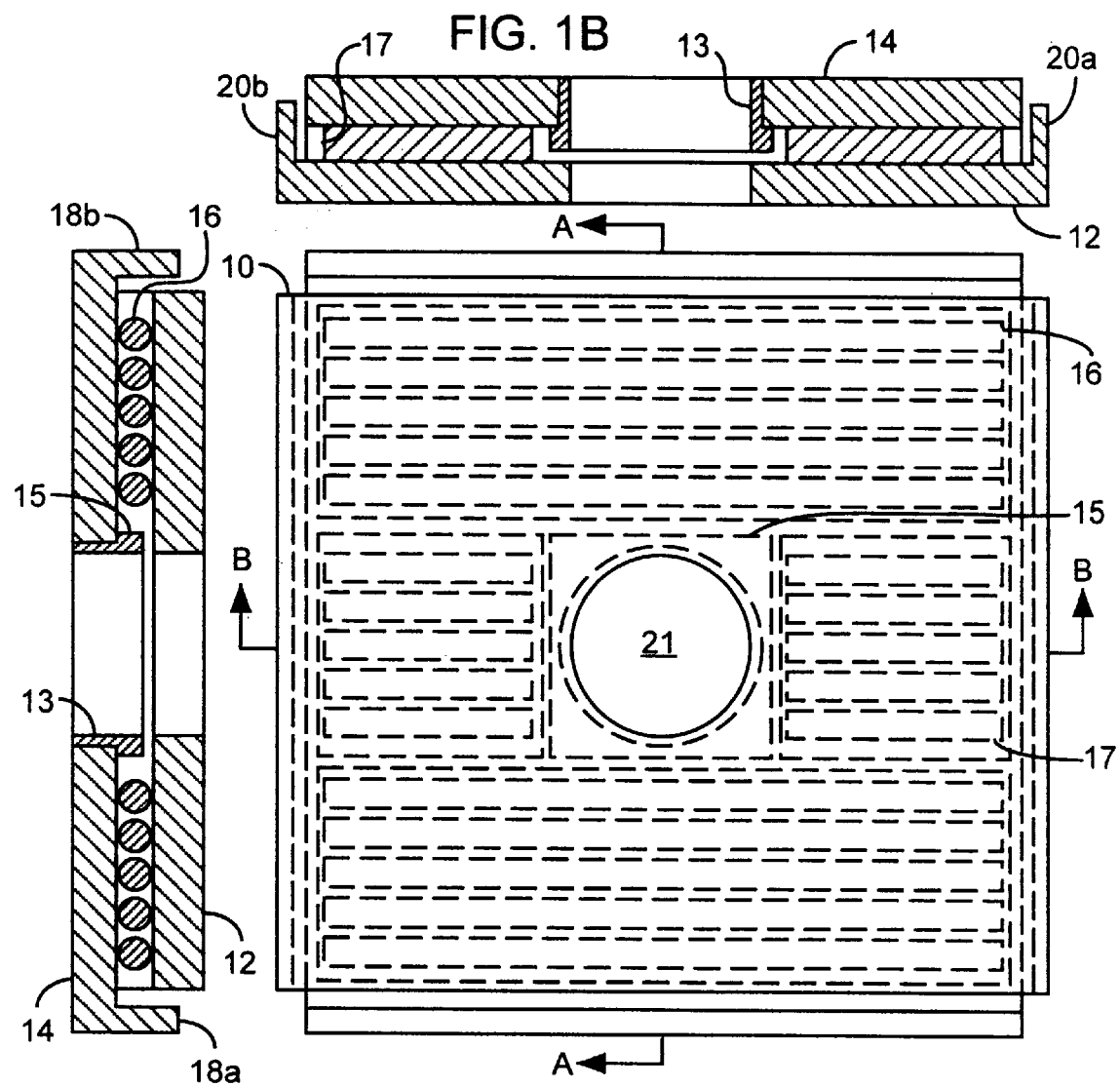
FIGS. 1A, 1B, and 1C are drawings of a roller washer bearing.

An embodiment of the invention is described with reference to the figures using reference designations as shown in the figures. Referring to FIG. 1, a roller washer bearing 10 preferably comprises a plurality of long and short rods 16 and 17 extending horizontally and unidirectionally and are disposed between a top washer plate 12 and a bottom washer plate 14. In the preferred form, rods 16 are long rollers and rods 17 are short rollers. The roller washer bearing 10 including a circular insert 13 having an outer confinement surface 15 and a center circular aperture 21. The bottom washer plate 14 includes opposing vertically extending retention flanges 18a and 18b, and top washer plate 12 includes opposing vertically extending retention flanges 20a and 20b. The rollers 16 and 17 are undirectionally aligned in a horizonal position and are retained within the bearing 10.

As shown, the ends of the long rollers 16 are confined by flanges 20a and 20b, the ends of the short rollers 17 are confined by flanges 20a and 20b, and the confinement surface 15. The confinement of the rollers 16 and 17 of the roller bearing 10 resists relative bidirectional movement of the top and bottom plates 12 and 14 along the length of the rollers 16 and 17. However, distances between the flanges 18a and 18b, and the distances between the confinement surface 15 and the flanges 18a and 18b, are greater than the accumulative thickness of the rollers 16 and 17 therebetween, so as to provide a small amount of space between the flanges 18a and 18b, and between the surface 15 and flags 18a and 18b, in which the respective rollers 16 and 17 may in unison roll back and forth in an alternating unidirectional cyclic rolling movement, to provide a single degree of relative motion between the top washer plate 12 and the bottom washer plate 14 rolling on the rods 16 and 17.

The roller washer bearing 10 is a multiple roller assembly including a parallel collection of roller rods 16 and 17 disposed between a top plate 12 and a bottom plate 14. The washer aperture 21 is disposed preferably in the center of the roller washer bearing 10. The roller rods 16 and 17 can roll back and forth in an alternating unidirectional movement so that the top washer plate 12 and bottom washer plate 14 can horizontally move small distances relative to each other while rolling on the rods 16 and 17. The roller rods 16 and 17, insert 13 and washer plates 12 and 14 can be machined from high strength alloys of steel, or other suitable materials. The top plate 12 and bottom plate 14 are configured to confine the rods in one direction while enabling rolling along the relative alternating unidirection movements of the plates 12 and 14 during alternating thermal expansion of the component plate relative to the base plate. The roller rods 16 and 17 may be lubricated for reducing friction and may be equally spaced using a filler material, not shown, such as RTV medium used to equally space the rods enabling repetitively back and forth rolling yet retain equal spacing even after many rolling cycles. As shown, the preferred roller rods 16 and 17 are confined in alignment. The rods 16 and 17 should be thick and strong enough to prevent collapse of the washer under expected loads. The roller bearing 10 is shown generally in the shape of a square, but other shapes, such as a circle, could be used as well, with suitably varying length rods. The long rods 17 may be 0.9 inches long, and the short rods may be 0.29 inches long, both with a 3/64 diameter. The top and bottom plates 12 and 14 may be 0.05 inches thick with 0.07 inch extending flanges 18 and 20. The center aperture may have a 0.252 inch diameters with the insert 13 having an a square confinement surface 15 of 0.282 inches for confining the rods 16 and 17 within the assembly 10.

Figure 2:
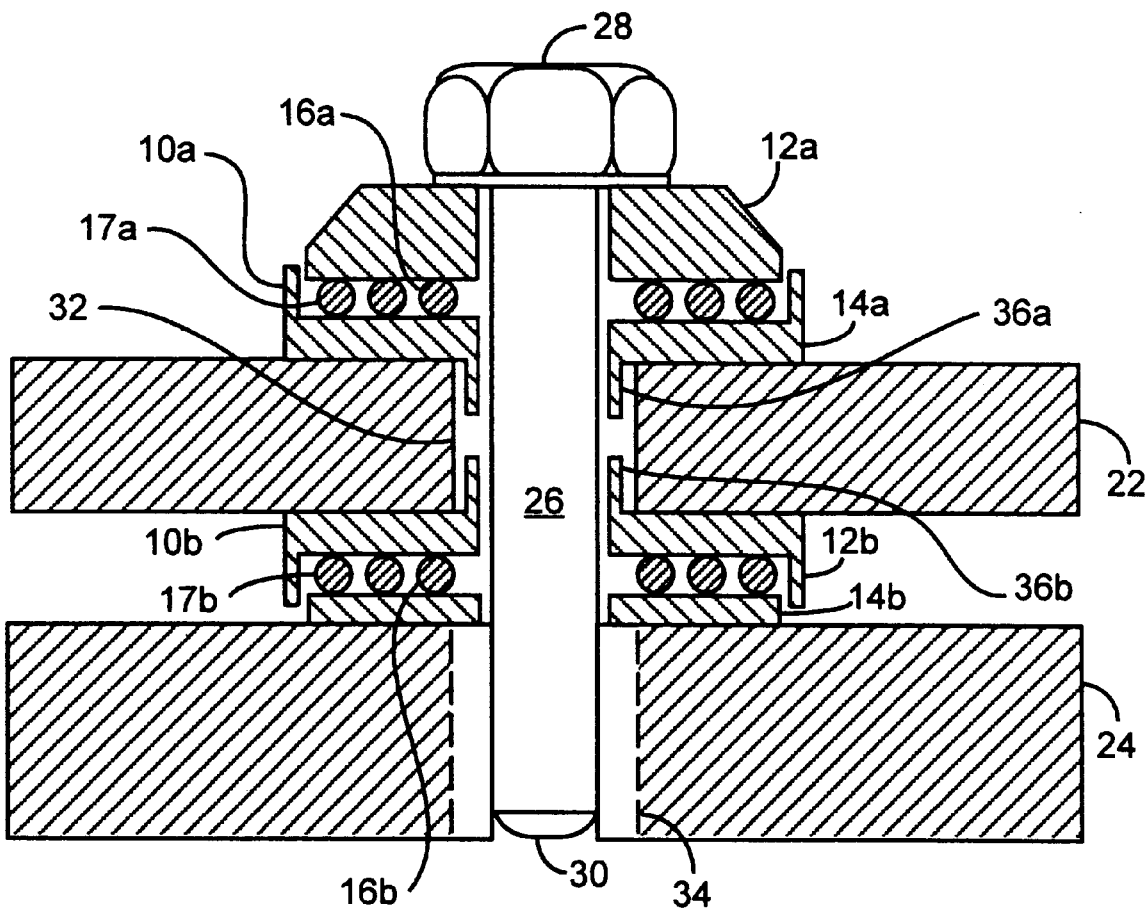
FIG. 2 is a drawing of a roller washer bearing assembly.

Referring to FIGS. 1 and 2, and more particularly to FIG. 2, two roller washer bearings 10a and 10b comprise roller rods 16 and 17, only a few of which are shown for clarity without the confining insert 13. The bearings 10a and 10b further comprise top washer plates 12a and 12b, and bottom washer plates 14a and 14b, and are used to enable relative horizontal motion between a top component plate 22 and a bottom base plate 24. The roller rods 16 and 17 are arranged in a plane parallel to the plates 22 and 24 and extend orthogonal to relative thermal expansion and contraction motion of the top component plate 22 relative to the bottom base plate 24. The roller rods 16 and 17 and the shape of the bearings 10 constrain all other translatory and rotational motion of the component plate 22 relative to the base plate 24. A bolt 26 comprising a threaded stem 26 and bolt head 28 extends vertically through the plates 22 and 24, through a bore hole 32 in the top component plate 22 and a threaded hole 34 in the bottom base plate 24. Here, the top plate 12a is shown to have a bevel edge for transfer of the load from the bolt 26 to the roller rods 16 and 17 and for proper orientation of the roller washer bearing, whereas the bottom plate 14b remains substantially flat for buttress against the base plate 24. The holes 32 and 34 are in initial alignment when the top and bottom plates 22 and 24 are initially fastened together. The base plate 24 could be a honeycomb structure having a low coefficient of thermal expansion, whereas the component plate 22 may be an aluminum mounting plate having a high thermal coefficient of expansion. The relative movement between the plates 22 and 34 may be, for example, 0.004 inches over a wide temperature range.

The roller washer bearings 10a and 10b may further respectively comprise pilot registrations 36a and 36b for centering the bearings 10a and 10b into the hole 32. The registrations 36a and 36b are optional circular vertically extending flanges initially centered within bolt hole 32 to align the bearings 10a and 10b to the bolt hole 32. As shown, the hole 32 is larger than the diameter of the registrations 36a and 36b, and much larger than the diameter of the bolt stem 30, so that the top component plate 22 can move horizontally relative to the bottom base plate 24 while the bolt 36 remains in a vertical position while rigidly affixed to, preferably screwed into, the bottom base plate 24.

The two roller washer bearings 10a and 10b are disposed in alignment around a bolt hole 32 having a larger diameter than the fastening bolt stem 30 extending through the bolt hole 32 in the top component plate 22 and into the bottom base plate 24 into which the bolt 26 is rigidly fastened. The bolt 28 fastens together the top component plate 22, the bottom base plate 24 and the two roller washer bearings 10a and 10b. The bottom roller bearing 10b is disposed between the bottom base plate 24 and the top component plate 22, and the top roller bearing 10a is disposed between the bolt head 28 and the top component plate 22. As the top component plate 22 expands or contracts back and forth in slight horizontal alternating unidirectional movement relative to the bottom base plate 24 during temperature variations, the bottom washer plate 14b of the bottom washer 10b remains rigidly affixed to the bottom component plate 24, and, the top washer plate 12a of the top washer bearing 10a remains rigidly affixed to the bolt head 28, as the bottom washer plate 14a of the top washer 10a and the top washer plate 12b of the bottom washer bearing 10b remain affixed to the top component plate 22. The rollers 16 and 17 of both bearings 10a and 10b roll back and forth providing the top and bottom washer plates 12 and 14 with relative movement equal to the differential motion caused by expansion and contraction of the top component plate 22 relative to the base plate 24 without placing stresses upon the bolt 26. As the top component plate 22 moves back and forth, the rollers 16 and 17 roll back and forth so that the hole 32 in the top component plate 22 moves in misalignment relative to the thread hole 34 in the bottom base plate 24. At all times, the bolt 26 remains in a rigid vertical and orthogonal position relative to the horizontally extending plates 22 and 24. The hole 32 in the component plate 22 is larger than bolt stem 30 to create sufficient circumferential space around the stem 30 for the relative movement of the top component plate 22 without the top component plate 22 inducing stresses in by contact with the fastening bolt 26.

Figure 3:
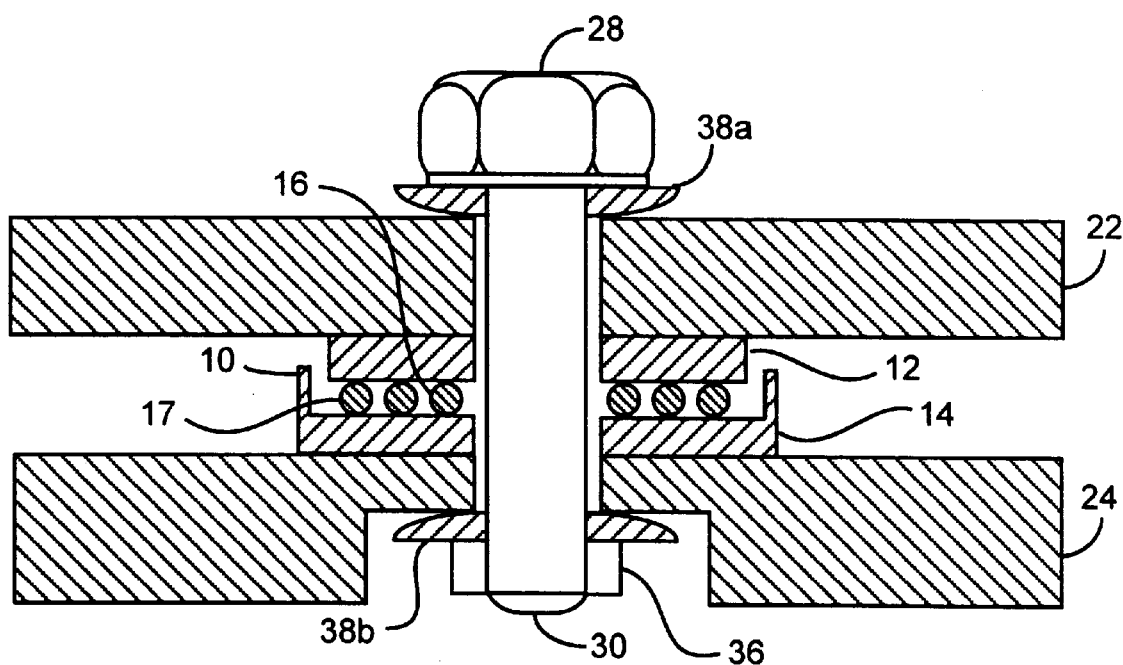
FIG. 3 is a drawing of a roller washer bearing with rocker washers.

Referring to FIG. 3, a single roller washer bearing 10, including the roller rods 16 and 17, a top washer plate 12 and bottom washer plate 14 are disposed between the top component plate 22 and bottom base plate 24. The bolt 26 extends through the bolt hole 32 and is fastened using a nut 36. Two rocker washers 38a and 36b are disposed so as to juxtapose the bolt head 28 and nut 36 at the end of bolt stem 30. During relative horizontal movement of the top component plate 22 relative to the bottom base plate 24, the top washer plate 22 remains affixed to the bottom of the top component plate 22, the bottom washer plate 14 remains affixed to the top of the bottom base plate 24, the roller rods 16 and 17 roll back and forth in alternating unidirectional motion in the same direction of the relative movement, the bolt 26 rotates and is cocked to an angle relative to the bolt hole, and the rocker washers 38, each having a curved surface buttressing the plates 12 and 24, rotate as the bolt 26 rotates to its cocked position. During relative movement, the bolt 26 no longer remains in vertical upright position, but cocks back and forth, as the head 28 pivots on rocker washer 38a, as the end of the stem 30 pivots on rocker washer 38b, as the top component plate 22 moves back and forth, during temperature cycling.

In both assemblies of FIGS. 2 and 3, the roller rods 16 extend horizontally and unidirectionally and roll back and forth in a horizontal plane orientation so as to enable relative horizontal movement along one direction, for example, a left and right orientation of the view of the FIGS. 2 and 3, so as to resist movement other than this in this left and right direction. In many applications, such as with the use of large circular component and base plates, the expansion and contraction is radial in direction extending from the center of the circular component plate to each of a plurality of mounting bolts 26. The roller washer bearings 10 can be disposed to align the rolling direction of the roller rods 16 and 17 to this radial relative movement, with rods 16 and 17 being orthogonally disposed to the radial expansion and contraction, and as such, the rods 16 and 17 enable radially alternating unidirectional relative movement, while resisting circumferential relative movement between the component and base plates 22 and 24. Thus, the roller washer bearings 10 provide a single degree of freedom of movement of alternating unidirectional relative motion of the plates 22 and 24 in the radial direction.

The circular pilot registrations 36 are used for centering the roller washer bearing 10 around the bolt hole 32, but do not orient the washer bearing 10 in the direction of relative radial motion in the circular radial expansion and contraction application. Hence, the washer bearing 10 could be easily modified to have radial orientation means, such as a pin and hole registration for aligning the rollers 16 and 17 orthogonal to the radial expansion and contraction.

Figure 4:
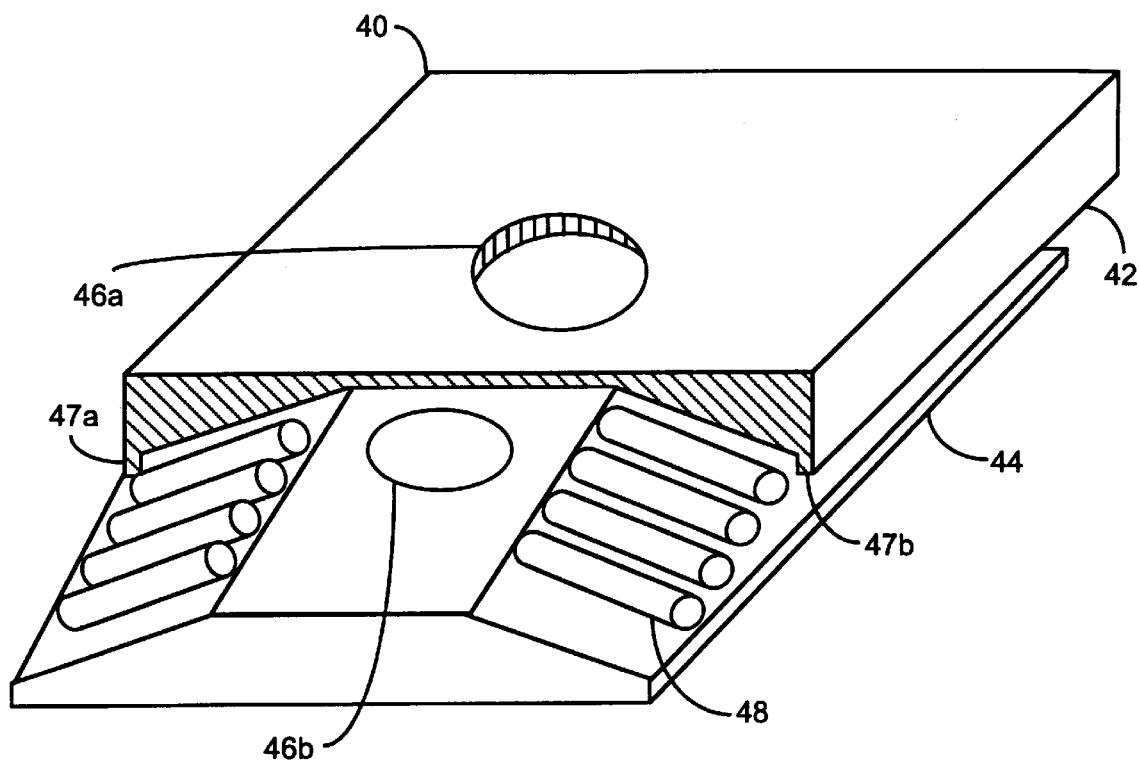
FIG. 4 is a drawing of slanted washer bearing.

Referring to FIG. 4, a slanted roller washer bearing 40 comprises a top washer plate 42 with an aperture 46a and confinement flanges 47a and 47b, a bottom washer plate 44 with an aperture 46b, and rolling rods 48 which are slanted at an angle relative to the horizontal plane. The slanted configuration of this roller washer bearing enables the top and bottom to move back and forth in alternating unidirectional horizontal movement with added restraint against translatory movement.

The exemplary assemblies of FIGS. 2 to 4 enable movement in one direction by restraining relative motion in other translatory and rotational directions. However, the assemblies could be modified to include secondary washer bearings having roller alignment orthogonal to the primary washer bearings, with the secondary washer bearing enabling movement in another orthogonal direction.

The roller washer bearing 10 is an assembly used as a load bearing mechanism for disposition between two mounting plates having relative movement, which may be caused, for example, by thermal cycling. The rollers avoid interface friction shear forces. The full strength of the bolt with normal preloads can be maintained to support components on the component plate. Those skilled in the art can make enhancements, improvements and modifications to the invention. However, those enhancements, improvements and modifications may nonetheless fall within the spirit and scope of the following claims.

What is claimed is:

1. A roller washer bearing for enabling alternating unidirectional movement of a top plate relative to a bottom plate fastened together by a fastening means extending through the roller washer bearing and providing a loading force, the washer comprising, a plurality of rods unidirectionally aligned within a horizontal plane parallel to the top and bottom plates, the rods extending horizontally and in parallel in the horizontal plane parallel to the top plate and the bottom plate while supporting the loading force, the rods being elongated rollers rolling back and forth in alternating unidirectional motion parallel to the horizontal plane, top surface means for confining the rods in the horizontal plane and for buttressing the top plate, bottom surface means for confining the rods in the horizontal plane and for buttressing the bottom plate, and an aperture extending through the top surface means and bottom surface means for receiving the fastening means, the aperture being larger than the fastening means for providing space around the fastening means for enabling the fastening means to move relative to the top plates as the rods roll back and forth as the top plate moves back and forth in alternating unidirectional movement relative to the bottom plate.

2. The roller washer bearing of claim 1, wherein the plurality of rods are confined by flanges extending from the top and bottom surface means to confine the rods to roll along the bidirectional motion.

3. The roller washer bearing of claim 1 wherein, the rods are steel alloy rods, and the top and bottom surface means are flat plates with orthogonally extending flanges for confining the rods.

4. The roller washer bearing of claim 1, wherein each of the top surface means comprises a top washer plate with opposing downwardly extending confinement flanges, and the bottom surface means comprises a bottom washer plate with opposing upwardly extending flanges for confining the rods, the rods being disposed between the top and bottom washer plates and confined therein by the confinement flanges.

5. A roller washer bearing assembly for enabling alternating unidirectional movement of a top plate relative to a bottom plate fastened together under a loading force, the roller bearing washer assembly comprising, a fastening means extending between the top plate and bottom for fastening together the top plate and bottom plate, and a roller washer bearing comprising:
a plurality of rods unidirectionally aligned in parallel within a horizontal plane parallel to the top plate and the bottom plate, the rods extend horizontally in the horizontal plane parallel to the top plate and the bottom plate while supporting the loading force, the rods are small diameter elongated rollers for rolling back and forth in alternating unidirectional motion parallel to the horizontal plane;
top surface means for confining the rods in the horizontal plane and for buttressing the top plate,
bottom surface means for confining the rods in the horizontal plane and for buttressing the bottom plate, and
an aperture through the roller washer, top surface means and bottom surface means for receiving the fastening means, the aperture being larger than the fastening means for providing space around the fastening means for enabling the fastening means to move relative to the top plates as the rods roll back and forth as the top plate alternatingly moves unidirectionally relative to the bottom plate.

6. The roller washer assembly of claim 5 wherein, the fastening means is bolt having a bolt head and a stem, the stem being rigidly fastened to the bottom plate, and the top plate has a bolt hole which is larger than the stem for providing circumferential space around the bolt stem for enabling the bolt to move relative to the top plate as the rods roll back and forth as the top plate moves relative to the bottom plate.

7. The roller washer assembly of claim 5 wherein the fastening means is a bolt having a bolt head and a stem, the stem being rigidly fastened to the bottom plate, the top plate has a bolt hole which is larger than the stem for providing circumferential space around the bolt stem for enabling the bolt to move relative to the top plate as the rods roll back and forth as the top plate moves relative to the bottom plate, and the roller washer means is a top roller washer and a bottom roller washer each comprising the plurality of rods and the top and bottom surface means, the top roller washer has the top surface means affixed to the bolt head and the bottom surface means affixed to the top plate, the bottom roller washer has the top surface means affixed to the top plate and the bottom surface means affixed to the bottom plate.

8. The roller washer assembly of claim 5 wherein the fastening means is bolt having a bolt head, nut, a head rocker washer, a stem rocker washer, and a threaded stem, the stem being fastened to the bottom plate using the nut, the rocker washers have curved surfaces for cocking the bolt within a bolt hole extending through the top and bottom plates, the top plate has the bolt hole which is larger than the stem for providing circumferential space around the bolt stem for enabling the bolt to pivot about the head and stem to cock the bolt at an angle in the bolt hole as the rods roll back and forth as the top plate moves relative to the bottom plate, and the roller washer means is a roller washer, the roller washer has the top surface means affixed to the bottom of the top plate and has the bottom surface means affixed to the top of the bottom plate as the rods roll back and forth during relative movement between the top and bottom plates.

* * * * *